US011250174B2

(12) United States Patent
    Kashimoto et al.

(10) Patent No.: US 11,250,174 B2
(45) Date of Patent: Feb. 15, 2022

(54) CAD DEVICE AND PROGRAM

(71) Applicant: VIVITA JAPAN, INC., Fukuoka (JP)

(72) Inventors: Kazutoshi Kashimoto, Fukuoka (JP); Jimi Okelana, Fukuoka (JP); Kazuto Nishizawa, Fukuoka (JP); Shota Kagami, Fukuoka (JP)

(73) Assignee: VIVIWARE JAPAN, INC., Fukuoka (JP)

( * ) Notice: Subject to any disclaimer, the term of this patent is extended or adjusted under 35 U.S.C. 154(b) by 218 days.

(21) Appl. No.: 16/488,376

(22) PCT Filed: Feb. 26, 2018

(86) PCT No.: PCT/JP2018/007059
§ 371 (c)(1),
(2) Date: Aug. 23, 2019

(87) PCT Pub. No.: WO2018/155698
PCT Pub. Date: Aug. 30, 2018

(65) Prior Publication Data
US 2020/0242278 A1    Jul. 30, 2020

(30) Foreign Application Priority Data
Feb. 27, 2017  (JP) .............................. JP2017-035520

(51) Int. Cl.
    *G06F 30/10*        (2020.01)
    *G06F 119/18*       (2020.01)
(52) U.S. Cl.
    CPC .......... *G06F 30/10* (2020.01); *G06F 2119/18* (2020.01)
(58) Field of Classification Search
    CPC .............................. G06F 30/10; G06F 2119/18
    See application file for complete search history.

(56) References Cited

U.S. PATENT DOCUMENTS 6,132,349 A * 10/2000 Yokoyama ............ B31F 1/0012
                                                493/86
6,643,561 B1 * 11/2003 Torvinen ................ B23K 26/08
                                                700/166

(Continued)

FOREIGN PATENT DOCUMENTS

JP        S6362639 A       3/1988
JP       H09216076 A       8/1997

(Continued)

OTHER PUBLICATIONS

Aoki et al. ("Forming three-dimensional closed shapes from two-dimensional soft ribbons by controlled", The Royal Society Publishing, 2018, pp. 1-11) (Year: 2018).*

(Continued)

*Primary Examiner* — Iftekhar A Khan
(74) *Attorney, Agent, or Firm* — Cantor Colburn LLP

(57) ABSTRACT

The present invention provides a technique for forming a prescribed three-dimensional shape from a material member having a prescribed thickness. A CAD device creates a mold for cutting out at least one component for forming a prescribed three-dimensional shape from a material member. A developed view generation unit creates a developed view or an isolated plan view of the prescribed three-dimensional shape. On the basis of the developed view or the isolated plan view, a mold creation unit creates a mold for a component having a fitting part for fitting with an other, adjacent component. A cut-out order determination unit attaches a symbol indicating the cut-out order to each component or to each of a plurality of isolated elements in the component.

5 Claims, 11 Drawing Sheets

(56) References Cited

U.S. PATENT DOCUMENTS

| | | | | |
|---|---|---|---|---|
| 8,114,524 | B2* | 2/2012 | Durney | E04C 3/32 |
| | | | | 428/597 |
| 8,438,893 | B2* | 5/2013 | Durney | B21D 51/52 |
| | | | | 72/324 |
| 10,282,914 | B1* | 5/2019 | Tran | G01G 19/44 |
| 10,864,686 | B2* | 12/2020 | Lancaster-Larocque | |
| | | | | G06F 1/1662 |
| 2002/0184936 | A1* | 12/2002 | Gitlin | B21D 5/00 |
| | | | | 72/379.2 |
| 2004/0134250 | A1* | 7/2004 | Durney | B21D 35/00 |
| | | | | 72/324 |
| 2004/0206152 | A1* | 10/2004 | Durney | H05K 5/04 |
| | | | | 72/379.2 |
| 2005/0005670 | A1* | 1/2005 | Durney | B21D 11/20 |
| | | | | 72/379.2 |
| 2005/0097937 | A1* | 5/2005 | Durney | B32B 3/30 |
| | | | | 72/324 |
| 2005/0131569 | A1 | 6/2005 | Matsuoka et al. | |
| 2006/0041448 | A1* | 2/2006 | Patterson | G06Q 10/101 |
| | | | | 705/301 |
| 2006/0207212 | A1* | 9/2006 | Durney | E04C 3/02 |
| | | | | 52/846 |
| 2007/0044899 | A1* | 3/2007 | Tingley | B29C 70/382 |
| | | | | 156/166 |
| 2008/0006017 | A1* | 1/2008 | Rindels | B29C 70/384 |
| | | | | 57/112 |
| 2010/0200168 | A1* | 8/2010 | Oldani | B29C 70/382 |
| | | | | 156/441 |
| 2012/0318314 | A1* | 12/2012 | Okuda | E04H 1/1205 |
| | | | | 135/96 |
| 2015/0055085 | A1* | 2/2015 | Fonte | H04N 5/23219 |
| | | | | 351/178 |
| 2016/0092605 | A1* | 3/2016 | Mccrae | G06T 17/00 |
| | | | | 703/1 |
| 2016/0318248 | A1* | 11/2016 | Susnjara | B25J 9/026 |
| 2016/0332369 | A1* | 11/2016 | Shah | B33Y 30/00 |
| 2018/0050502 | A1* | 2/2018 | Oldani | B29C 70/384 |
| 2019/0009472 | A1* | 1/2019 | Mark | B29C 70/384 |
| 2019/0065629 | A1* | 2/2019 | Phinney | G06F 30/00 |
| 2019/0127913 | A1* | 5/2019 | Sheehan | B29C 64/112 |
| 2021/0089002 | A1* | 3/2021 | Jacobs, II | G06Q 10/06313 |

FOREIGN PATENT DOCUMENTS

| | | |
|---|---|---|
| JP | 2006302125 A | 11/2006 |
| JP | 2007526131 A | 9/2007 |
| JP | 2007533465 A | 11/2007 |
| JP | 2012213805 A | 11/2012 |
| WO | 03079238 A1 | 9/2003 |
| WO | 2004028937 A2 | 4/2004 |
| WO | 2005082112 A2 | 9/2005 |
| WO | 2005099925 A2 | 10/2005 |

OTHER PUBLICATIONS

International Search Report corresponding to Application No. PCT/JP2018/007059; dated Jun. 19, 2018.

Extended Search Report for corresponding EP Application No. 18757833.1; dated Feb. 27, 2020.

Hidehiko Okabel et al: "Three Dimensional Apparel CAD System", Computer Graphics, vol. 26, Jul. 26, 1992 (Jul. 26, 1992), pp. 105-110, XP055670318.

Hinds B K et al: "Pattern Development for 3D Surfaces", Computer Aided Design, Elsevier Publishers BV., Barking, GB, vol. 23, No. 8, Oct. 1, 1991 (Oct. 1, 1991), pp. 583-592, XP000236521.

* cited by examiner

FIG. 10
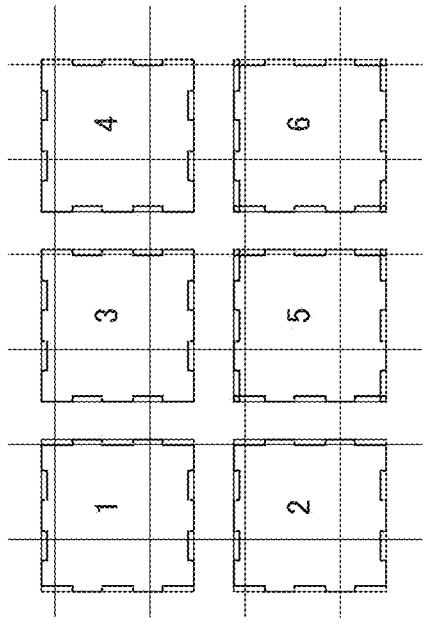
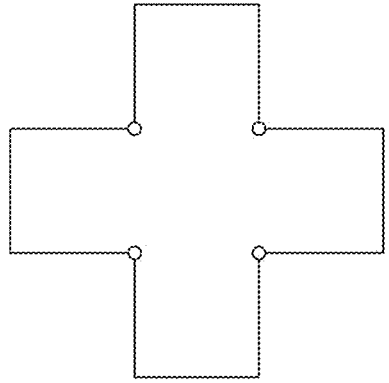
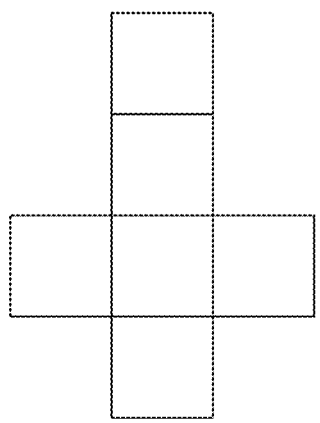

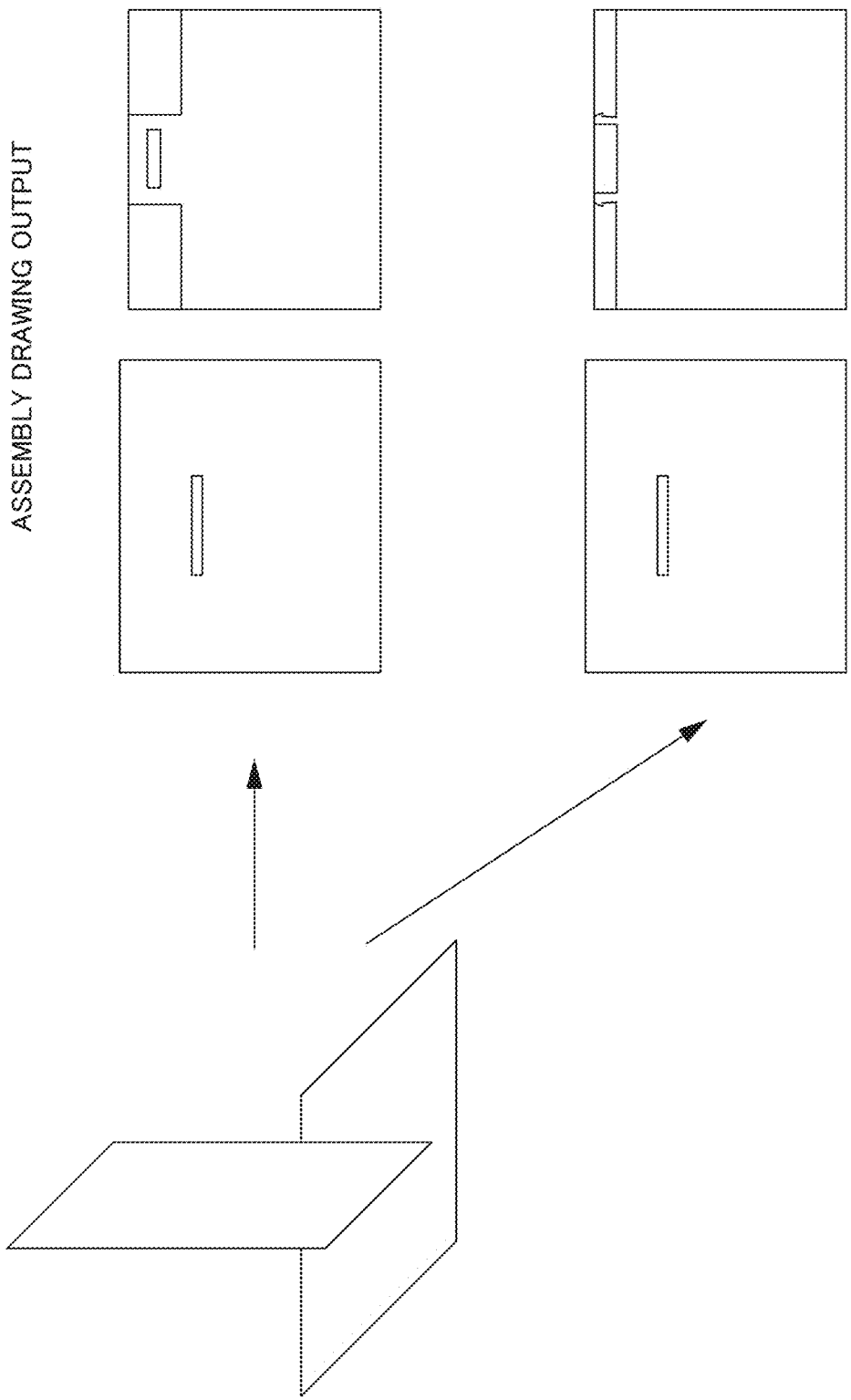

CAD DEVICE AND PROGRAM

CROSS REFERENCE TO RELATED APPLICATIONS

This is the U.S. national stage of application No. PCT/JP2018/007059, filed on Feb. 26, 2018. Priority under 35 U.S.C. § 119(a) and 35 U.S.C. § 365(b) is claimed from Japanese Application No. 2017-035520, filed Feb. 27, 2017; the disclosures of which are incorporated herein by reference.

TECHNICAL FIELD

The present invention relates to a CAD device and program.

BACKGROUND ART

Conventionally, a CAD system for creating a developed view exists (see, for example, Patent Document 1).

Patent Document 1: Japanese Unexamined Patent Application, Publication No. 2006-302125

DISCLOSURE OF THE INVENTION

Problems to be Solved by the Invention

However, conventional techniques including the technique disclosed in Patent Document 1 cannot realize providing a technique for forming a prescribed three-dimensional shape from a material member having a prescribed thickness.

The present invention has been made in view of such a situation, and it is an object of the present invention to form a prescribed three-dimensional shape from a material member having a prescribed thickness.

Means for Solving the Problems

In order to achieve the above object, a CAD device according to an aspect of the present invention is a CAD device that creates a mold for cutting out at least one component for forming a prescribed three-dimensional shape from a material member, the device including: a creation means that creates a mold for a component having a fitting part for fitting with another, adjacent component on the basis of a developed view or the isolated plan view of the prescribed three-dimensional shape.

Effects of the Invention

According to the present invention, a prescribed three-dimensional shape can be formed from a material member having a prescribed thickness.

BRIEF DESCRIPTION OF THE DRAWINGS

FIG. 10 is a view illustrating an example of a mold which is created by the CAD device according to an embodiment of the present invention and which is changed depending on a material.

FIG. 11 is a view illustrating an example of a fitting part provided in a mold created by the CAD device according to an embodiment of the present invention.

PREFERRED MODE FOR CARRYING OUT THE INVENTION

Even when it is tried to print out a developed view of a prescribed three-dimensional shape on a material member with a prescribed thickness, clip the printed developed view with a laser cutter or the like, and bend the same, unlike an origami or a thin drawing paper and the like, an existence of the prescribed thickness makes the bending processing difficult. For this reason, even when the developed view is clipped from a material member having a prescribed thickness, it is not possible to form a prescribed three-dimensional shape from the developed view. However, a laser cutter or the like clips components forming a three-dimensional shape from a material member having a prescribed thickness on the basis of a plurality of molds including fitting parts, and a user or the like can form a prescribed three-dimensional shape by fitting the fitting parts of a plurality of the components on adjacent faces. Here, the mold means information indicating a stroke (hereinafter, referred to as a "cutting stroke") when a part of a periphery or an inside of the component is clipped from the material member. Here, the information indicating the cutting stroke includes not only the stroke itself but also various information by which a subject (a laser cutter device 2, a printer 3, or the like of FIG. 1 to be described later) that clips the components from the material member can recognize the cutting stroke. A CAD device of the present invention can automatically create the plurality of molds on the basis of the developed view of the prescribed three-dimensional shape. Hereinafter, an exemplary embodiment of the present invention will be described with reference to the appended drawings.

Figure 1:
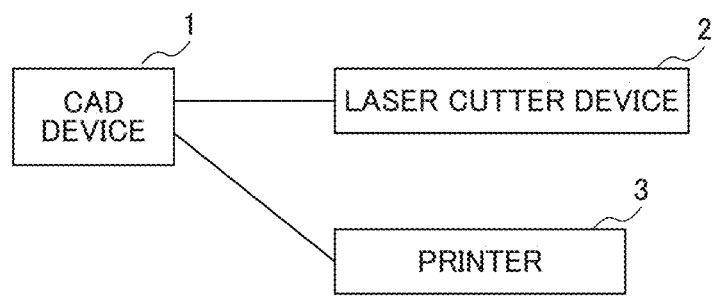
FIG. 1 is a block diagram illustrating a configuration of an information processing system according to an embodiment of the present invention.

FIG. 1 is a block diagram illustrating a configuration of an information processing system including a CAD device 1 according to an embodiment of the present invention. The information processing system illustrated in FIG. 1 is a system including the CAD device 1, the laser cutter device 2, and the printer 3. Further, the CAD device 1 communicates various information with each of the laser cutter device 2 and the printer 3 according to various communication methods such as Bluetooth (registered trademark).

The CAD device 1 creates a mold (drawing) of each component of a three-dimensional shape, and instructs the laser cutter device 2 to cut the material member on the basis of the pertinent mold or instructs the printer 3 to print the pertinent mold on the material member. The laser cutter device 2 irradiates a laser beam according to the instruction from the CAD device 1 to cut (cut by melting, cut by burning, or the like) the material member such as medium density fiberboard (MDF). That is, since the laser cutter device 2 does not use a blade for cutting the material member, it can easily clip the component based on a mold of a desired shape directly from the material member without cutting a periphery even at a central portion of the material member. The printer 3 prints a mold on a surface of the material member according to the instruction from the CAD device 1 so that the user can clip the components by cutting the member manually.

Figure 2:
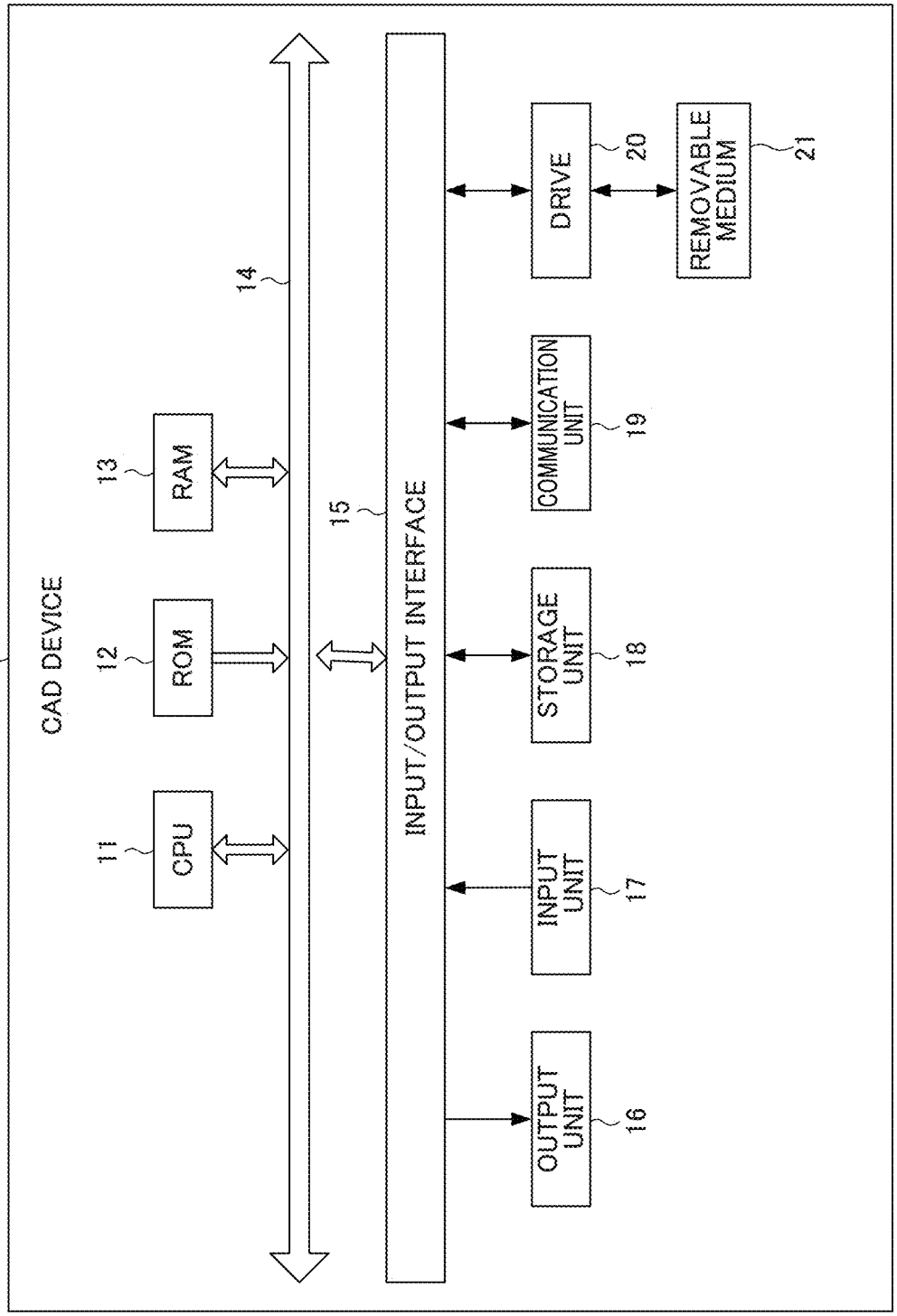
FIG. 2 is a block diagram illustrating an example of a hardware configuration of the CAD device according to an embodiment of the present invention.

FIG. 2 is a block diagram illustrating an example of a hardware configuration of the CAD device 1 according to an embodiment of the present invention. The CAD device 1 includes a central processing unit (CPU) 11, a read only memory (ROM) 12, a random access memory (RAM) 13, a bus 14, an input/output interface 15, an output unit 16, and an input unit 17, a storage unit 18, a communication unit 19, and a drive 20.

The CPU 11 executes various types of processes in accordance with a program stored in the ROM 12 or a program loaded from the storage unit 18 into the RAM 13. Data and the like which are necessary for the CPU 11 to execute various processes are also stored in the RAM 13 as appropriate.

The CPU 11, the ROM 12, and the RAM 13 are connected to one another via the bus 14. The input/output interface 15 is also connected to the bus 14. The output unit 16, the input unit 17, the storage unit 18, the communication unit 19, and the drive 20 are connected to the input/output interface 15.

The output unit 16 is constituted by a display such as liquid crystal and displays various images such as a design drawing image. The input unit 17 is constituted by various hardware buttons and the like, and inputs various information in accordance with a user's instruction operation.

The storage unit 18 is constituted by a dynamic random access memory (DRAM) or the like, and stores various data. The communication unit 19 controls communication with other devices (for example, the laser cutter device 2 and the printer 3) via a network N including the Internet.

The drive 20 is provided as necessary. A removable medium 21 made of a magnetic disk, an optical disk, a magneto-optical disk, a semiconductor memory, or the like is appropriately mounted to the drive 20. The program read from the removable medium 21 by the drive 20 is installed in the storage unit 18 as necessary. Further, the removable medium 21 can also store various data stored in the storage unit 18 in the same manner as the storage unit 18.

Such a cooperation of the various hardware and software of the CAD device 1 of FIG. 2 enables the CAD device 1 to execute a cut-out instruction process to be described later. The cut-out instruction process refers to a series of processes from generating a plurality of molds for clipping a plurality of components constituting the three-dimensional shape from a material having a prescribed thickness to outputting to the laser cutter device 2 an instruction to clip each component from the material member on the basis of the plurality of molds or outputting to the printer 3 an instruction to print the plurality of molds on the material member.

Figure 3:
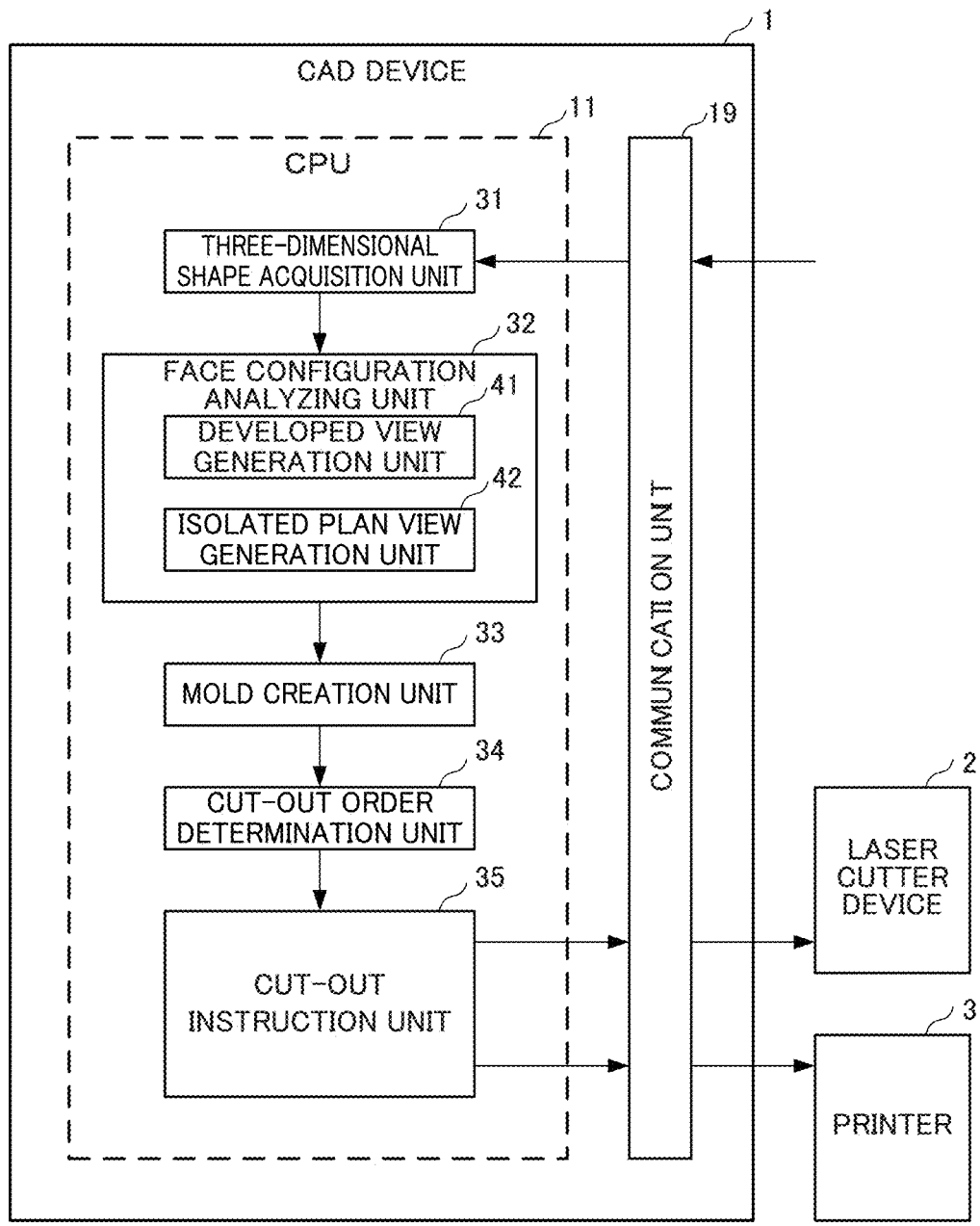
FIG. 3 is a functional block diagram illustrating an example of a functional configuration of the CAD device of FIG. 2 that enables execution of a cut-out instruction process among functional configurations.

FIG. 3 is a functional block diagram illustrating an example of a functional configuration of the CAD device 1 of FIG. 2 that enables execution of the cut-out instruction process. As illustrated in FIG. 3, when executing the cut-out instruction process, a three-dimensional shape acquisition unit 31, a face configuration analyzing unit 32, a mold creation unit 33, and a cut-out order determination unit 34, and a cut-out instruction unit 35 function in the CPU 11 of the CAD device 1.

The three-dimensional shape acquisition unit 31 acquires information on the three-dimensional shape of the prescribed three-dimensional shape from an outside via the communication unit 19.

The face configuration analyzing unit 32 analyzes a configuration of faces of the prescribed three-dimensional shape on the basis of the information acquired by the three-dimensional shape acquisition unit 31, and creates a developed view, an isolated plan view, or the like on the basis of an analysis result. That is, the face configuration analyzing unit 32 includes a developed view generation unit 41 for generating a developed view, and an isolated plan view generation unit 42 for generating an isolated plan view.

The mold creation unit 33 creates a mold having a fitting part for fitting with an adjacent face, as a mold of each of a plurality of components constituting the three-dimensional shape, on the basis of the developed view or the isolated plan view created by the face configuration analyzing unit 32.

The cut-out order determination unit 34 determines order of cutting out the member by the laser cutter device 2 or the user (hereinafter, referred to as "cut-out order") with respect to the mold or each of a plurality of isolated elements included in the mold.

The cut-out instruction unit 35 provides various instructions via the communication unit 19 to cause the laser cutter device 2 to cut out each component from the material member according to the cut-out order determined by the cut-out order determination unit 34 on the basis of the mold created by the mold creation unit 33. Specifically, for example, the cut-out instruction unit 35 transmits the information indicating the mold created by the mold creation unit 33 for the laser cutter device 2 via the communication unit 19 and the information indicating the cut-out order determined by the cut-out order determination unit 34. Here, the information indicating the cut-out order is sufficient as long as the subject (here, the laser cutter device 2, but also including the printer 3 and the like) that clips the components from the material member can recognize the cut-out order from the information, and a form of the information is not particularly limited. Specifically, for example, when the laser cutter device 2 is employed in which cut-out order is determined by a color of an input drawing (mold), information indicating that a color of each cutting stroke indicated by the mold differs according to the cut-out order is an example of the information indicating the cut-out order. Incidentally, an example of a specific technique which makes the cutting stroke into a different color according to the cut-out order will be described below with reference to FIG. 8 and FIG. 9. In addition, the cut-out instruction unit 35 provides various instructions via the communication unit 19 to cause the printer 3 to print a line or the like serving as a cut-out mark based on the mold created by the mold creation unit 33 on the material member.

Figure 4:
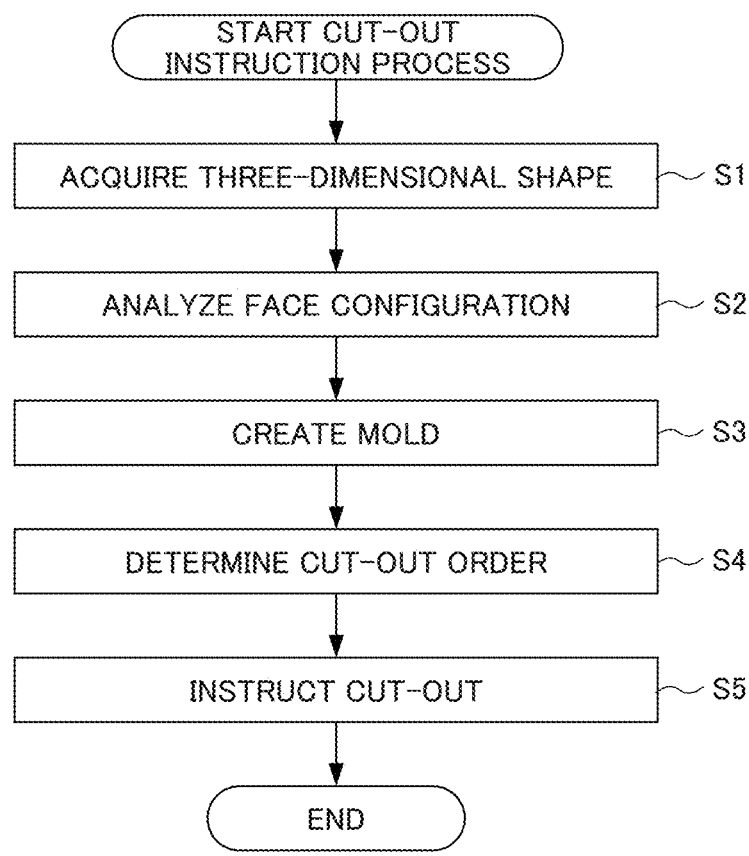
FIG. 4 is a flowchart for describing a flow of the cut-out instruction process executed by the CAD device having the functional configuration of FIG. 3.

FIG. 4 is a flowchart for describing a flow of the cut-out instruction process executed by the CAD device 1 having the functional configuration of FIG. 3.

In step S1, the three-dimensional shape acquisition unit 31 acquires information on a three-dimensional shape of a prescribed three-dimensional shape from an outside via the communication unit 19.

In step S2, the face configuration analyzing unit 32 analyzes a configuration of faces of the prescribed three-dimensional shape on the basis of the information acquired in step S1, and creates a developed view or an isolated plan view on the basis of a result of the analysis.

Figure 5:
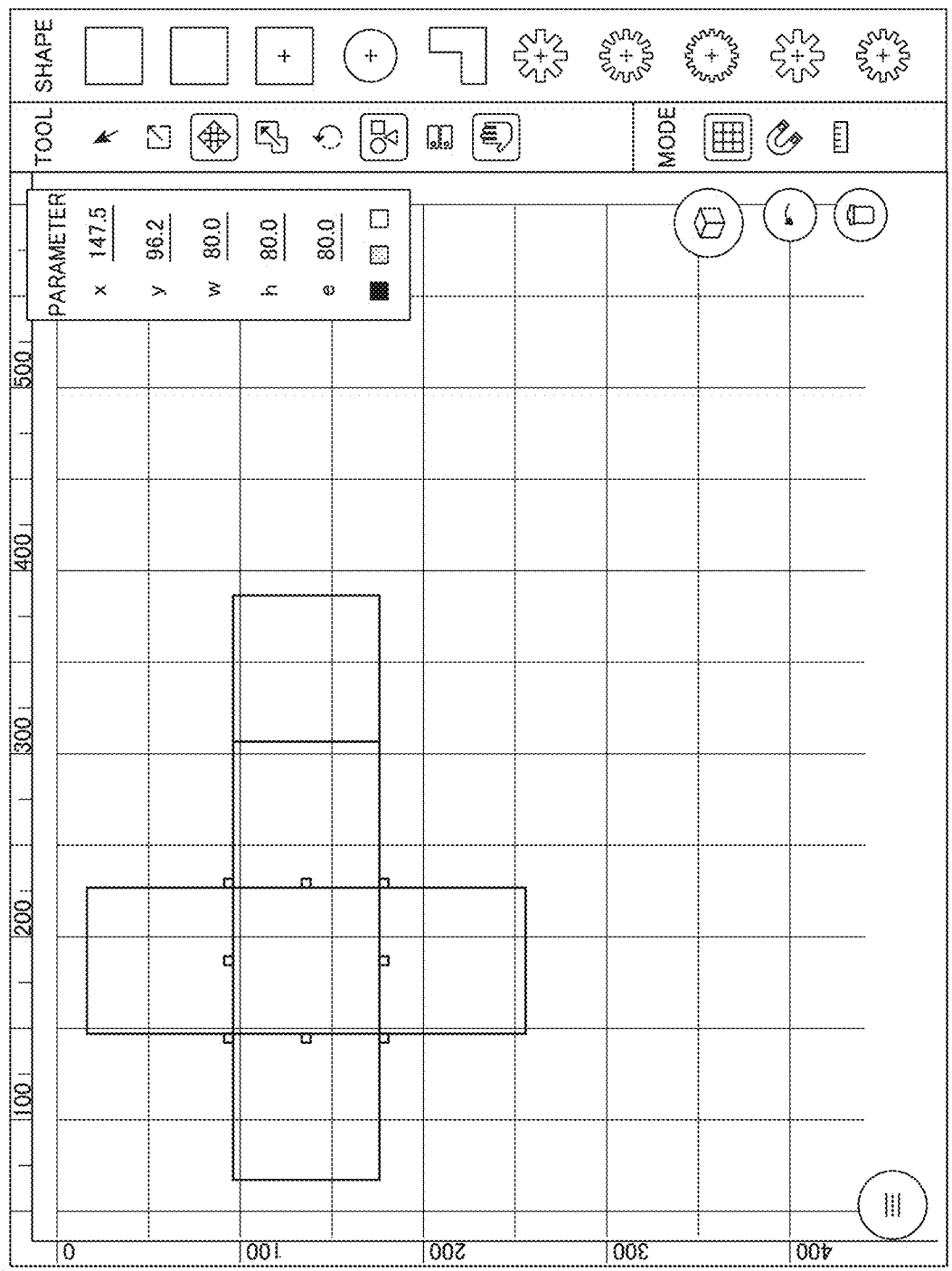
FIG. 5 is a view illustrating an example of a developed view of a three-dimensional shape created by the CAD device according to an embodiment of the present invention.

Specifically, for example, a developed view as illustrated in FIG. 5 is created in step S2. FIG. 5 is a view illustrating an example of a developed view of a three-dimensional shape created by the face configuration analyzing unit 32 of the CAD device 1 having the functional configuration of FIG. 3. A screen for CAD is displayed on the output unit 16 (such as a monitor) of the CAD device 1 at the time of the cut-out instruction process, and as illustrated in FIG. 5, at the timing of step S2, the developed view is arranged and displayed in a prescribed area of the screen.

Returning to FIG. 4, in step S3, the mold creation unit 33 creates a mold having a fitting part for fitting with an adjacent face, as a mold of each of the plurality of components constituting the three-dimensional shape, on the basis of the developed view, the isolated plan view, or the like created in step S2. In step S4, the cut-out order determination unit 34 determines cut-out order for the mold created in step S3 or each of a plurality of isolated elements included in the mold.

Figure 6:
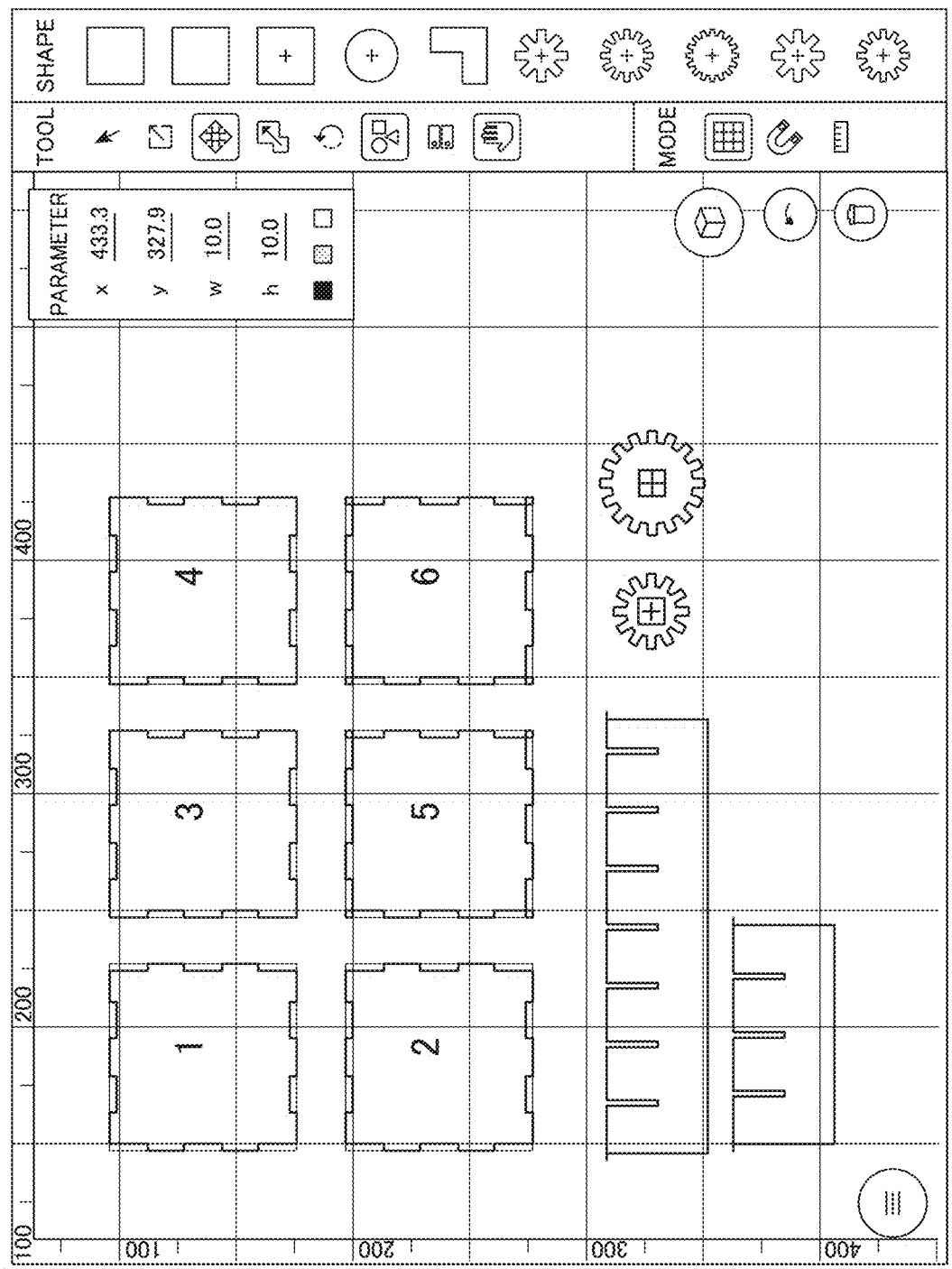
FIG. 6 is a view illustrating an example of a plurality of molds created by the CAD device of FIG. 1.

Specifically, for example, in step S3, a plurality of molds as illustrated in FIG. 6 is created on the basis of the developed view illustrated in FIG. 6, and in step S4, cut-out order such as a symbol (number) illustrated in FIG. 6 is determined. FIG. 6 is a view illustrating an example of the plurality of molds created by the mold creation unit 33 of the CAD device 1 having the functional configuration of FIG. 3. As described above, a screen for CAD is displayed on the output unit 16 (such as a monitor) of the CAD device 1 at the time of the cut-out instruction process, and as illustrated in FIG. 6, at the timing of step S3, six molds (corresponding to components of six faces constituting the three-dimensional shape) are disposed and displayed in a prescribed area in the screen. Further, at the timing of step S4, a symbol (number) indicating the cut-out order is disposed and displayed in an internal area of each of the plurality of molds.

Here, it should be noted that in a portion of each side of the six molds (a portion indicated by a thick line), the fitting part for fitting with the adjacent face is automatically created. On the basis of the six molds created in this manner, the laser cutter device 2 and the like can create the components (faces) constituting the three-dimensional shape (regular hexahedron) by clipping a material member (a plate and the like) having a thickness of one sheet. Here, positions at which the six molds are disposed in the screen correspond to cut-out positions in the material member. That is, although the mold creation unit 33 can create the six molds independently of one another, it can also create the six molds as one body in consideration of cut-out positions of the six molds. This makes it possible to efficiently cut out the six molds from a material member having a prescribed thickness of one sheet. That is, the mold creation unit 33 can also create the six molds as one body after optimizing the cut-out positions.

Here, in the example of FIG. 6, a template of the mold is disposed in a "shape" area provided at a right end of the screen. The user operates the CAD device 1 to select a template of a desired mold and arrange the template in the central area of the screen, thereby enabling the CAD device 1 to recognize the template as an original form of the mold. Specifically, for example, in the example of FIG. 6, a mold of a partition plate in a cardboard box or a mold of a gear is disposed under the mold for the three-dimensional shape (regular hexahedron) automatically manufactured. These molds are merely examples of molds recognized by the CAD device 1 by the user's selection operation.

Returning to FIG. 4, in step S5, the cut-out instruction unit 35 sends, via the communication unit 19, to the laser cutter device 2 or the printer 3 various instructions for cutting out the respective components constituting the three-dimensional shape from the material member on the basis of the mold created in step S3 and the cut-out order determined in step S4.

Although one embodiment of the present invention has been described above, the present invention is not limited to the above-described embodiment, and modifications, improvements, and the like within a scope which can achieve the object of the present invention are included in the present invention.

For example, in the above-described embodiment, for convenience of description, a cube is adopted as the prescribed three-dimensional shape, six square faces constituting the cube are adopted as the components, and a mold of the square face (component) is created. However, these are merely examples, and the CAD device 1 can create various types of modes for creating an arbitrary three-dimensional shape.

Specific examples of these various types of modes will be described below with reference to FIG. 7. As another example of the mold created by the CAD device 1 of FIG. 1, FIG. 7 is a view illustrating an example of a mold for producing "glasses" and "pencil stand" as the three-dimensional shape.

Figure 7:
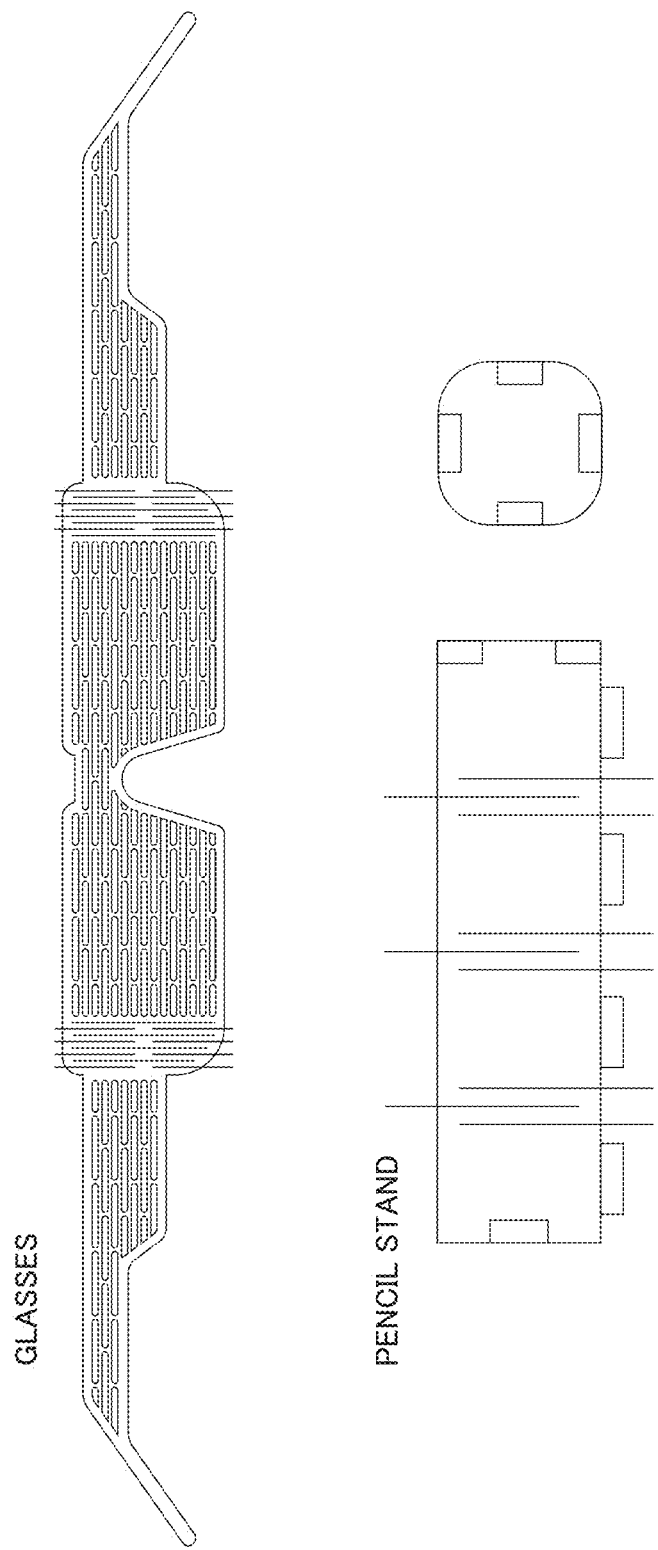
FIG. 7 is a view illustrating an example of a mold for creating "glasses" and "pencil stand" as the three-dimensional shape as another example of the mold created by the CAD device of FIG. 1.

The mold of "glasses" in the example of FIG. 7 can be seen through, even though it is an opaque member formed by providing a large number of fine slit through-holes in close proximity to each other as a whole using a feature of the laser cutter device 2 which can perform a clipping process. In addition, a part corresponding to a base of a string is incised, and a mold is created in which a movable part is provided with a simple structure without using a hinge. By applying such a mold, it is possible to create, for example, "glasses" of cheap disposable fashion goods.

In the example of FIG. 7, the mold of the "pencil stand" is incised in the same manner as the mold of "glasses." In addition, cut-out portions are disposed at positions where the pencil stand is substantially equally-divided into four portions in its longitudinal direction. Further, since the fitting parts are provided, it is possible to combine both longitudinal end portions, thus forming it into a substantially square pole cylindrical shape. Further, a mold of a bottom portion is formed so that the bottom portion can be formed by fitting a cylindrical open end to a substantially square flat plate.

Figure 8:
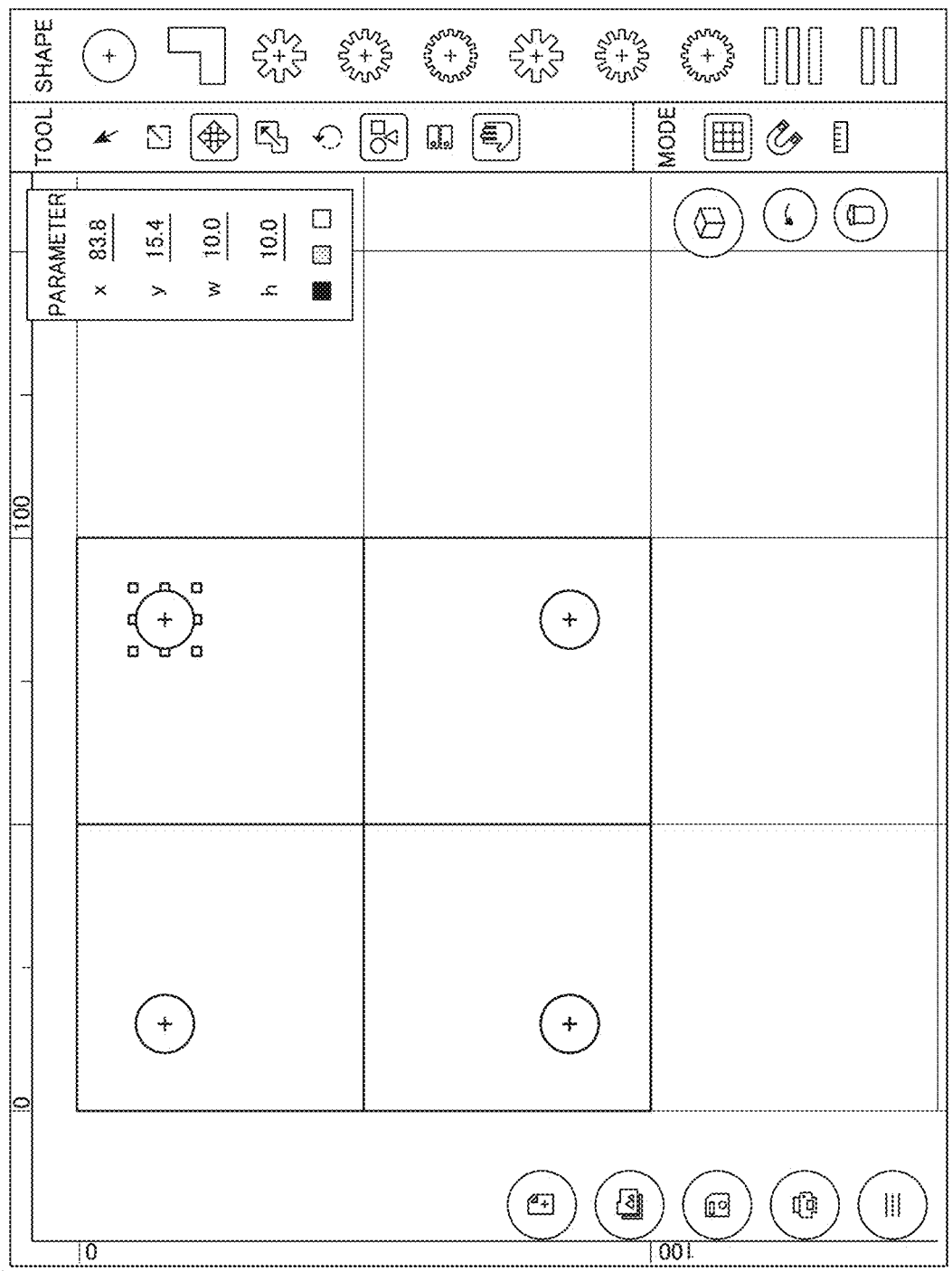
FIG. 8 is a view illustrating an example of a technique in which a user determines cut-out order for the mold created by the CAD device 1 of FIG. 3.
Figure 9:
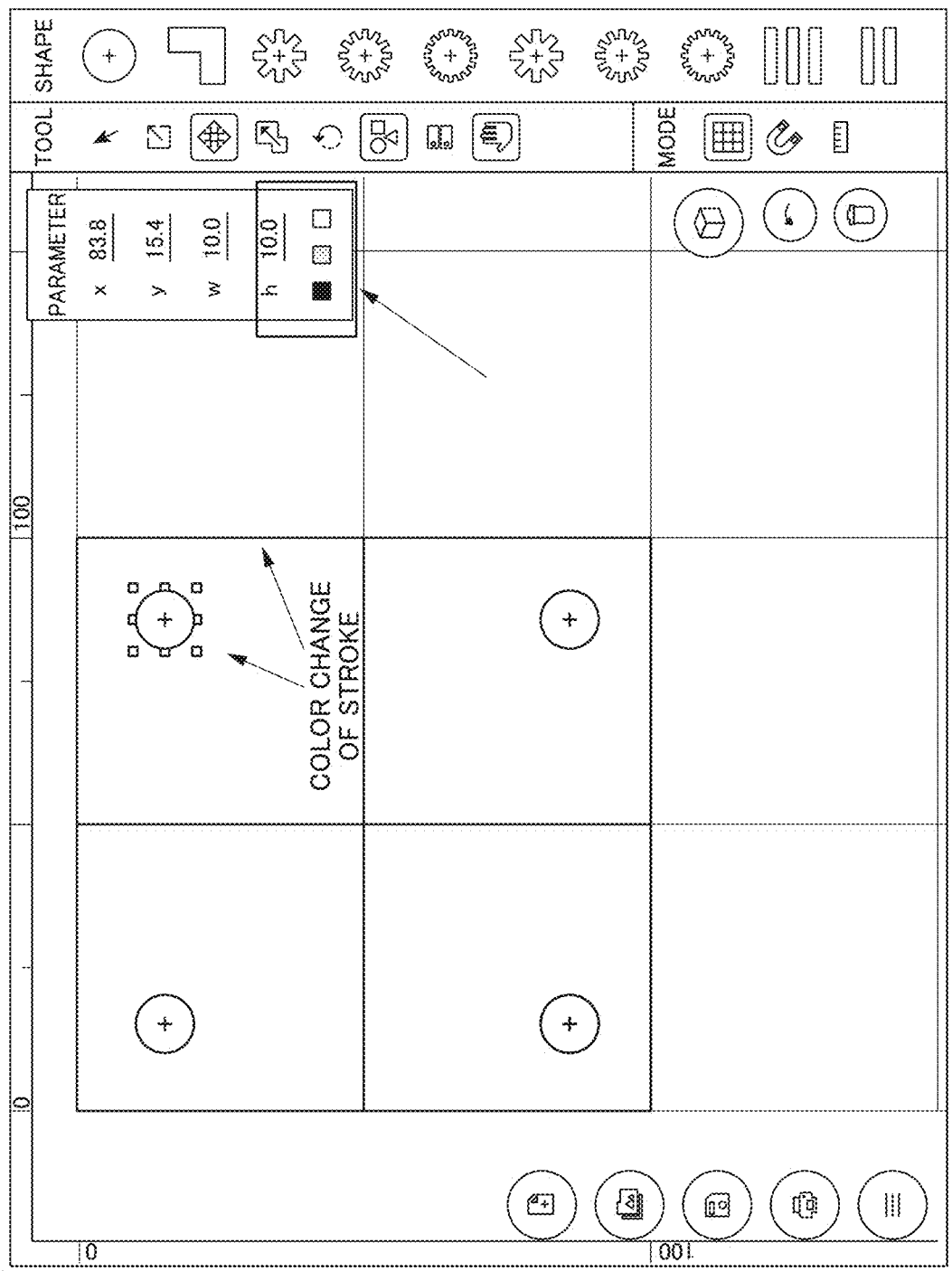
FIG. 9 is a view illustrating an example of a technique in which the user determines cut-out order for the mold created by the CAD device 1 of FIG. 3.

Further, for example, in the above-described embodiment, the determination of the cut-out order is automatically determined by the CAD device 1 by a prescribed internal logic. However, the determination of the cut-out order may be determined by the user as illustrated in FIG. 8 and FIG. 9. FIG. 8 and FIG. 9 are diagrams illustrating an example of a technique by which the user determines the cut-out order for the mold created by the CAD device 1 of FIG. 3.

FIG. 8 and FIG. 9 illustrate a screen for CAD in an example in which the cut-out order is represented by color coding of a line indicating a cutting stroke. That is, FIG. 8 and FIG. 9 illustrate a screen for CAD suitable for use when the laser cutter device 2 in which cut-out order is determined by a color of an input drawing (mold) is adopted. As illustrated in FIG. 8, the user operates the CAD device 1 to select an object whose color is to be changed. In the example of FIG. 8, an upper right square-shaped mold is selected. Next, as illustrated in FIG. 9, the user operates the CAD device 1 to change the color of the selected object. Specifically, for example, a mold for cutting out four square components having circular parts formed therein is illustrated in FIG. 8 and FIG. 9. Here, in the cut-out order, it is assumed that the circular part of the mold is the first and an outer peripheral part of the mold is the last. That is, for the material member, four circular parts are clipped at the first step, and a square part is clipped in the subsequent step. It is because it is not necessary to change a location where the material member is fixed so as not to move by setting such cut-out order. In other words, this is because if cut-out order of clipping the square part at the first step and clipping the four circular parts in the subsequent step is adopted, a time loss may occur since it is necessary to change the location where the material member is fixed so as not to move between steps. Then, order of cut-out steps performed by the laser cutter device 2 or the user is clarified by color coding and the like. This prevents the components from being clipped from the material member in erroneous order of steps.

Further, for example, the material member is assumed to have a prescribed thickness in the above-described embodiment, but the thickness is not particularly limited thereto and it may be an arbitrary thickness. In other words, as illustrated in FIG. 10, the CAD device 1 can create a suitable mold for any material member. FIG. 10 is a view illustrating an example of a mold which is created by the CAD device 1 according to an embodiment of the present invention and which is changed depending on the material. In the case of the material member (MDF or the like) having a prescribed thickness, as in the above-described embodiment, the CAD device 1 creates a mold of a component which is a component of each of a plurality of faces based on a developed view and has a fitting part for fitting with an adjacent face, as a premise of assembly. On the other hand, in the case of a material member which can be bent like an acrylic plate, the CAD device 1 creates one mold (a mold which is not separated into a plurality of components) on the premise of bending.

Further, in a case where a plurality of components is assembled to create a three-dimensional shape, a mold is created such that a fitting part is provided to combine the components. The method of combining the components by the fitting part includes but is not particularly limited to the above-described embodiment, and may be arbitrary. For example, as illustrated in FIG. 11, the CAD device 1 can also create different molds depending on a combining method. FIG. 11 is a view illustrating an example of a fitting part provided in a mold created by the CAD device 1 according to an embodiment of the present invention. For example, as illustrated in the upper side of FIG. 11, it is also possible to adopt a combining method in which a convex portion of one component as a fitting part is fitted into a hole part of the other component as a fitting part. In this case, the mold illustrated in the upper side of FIG. 11 is created. Alternatively, as illustrated in the lower side of FIG. 11, it is also possible to adopt a combining method using a fitting part where a lock mechanism is added to prevent detachment. In this case, a mold illustrated in the lower side of FIG. 11 is created.

Further, for example, the above-described laser cutter device 2 is an example and is not limited thereto. That is, any device such as a water cutter device may be used as long as it is easy for the device to clip directly without cutting a periphery even at a central portion of the material member. Further, for example, a device and procedure that clip a central portion of the material member directly with a fret saw or the like by drilling using a drill, a punch, or the like may be adopted.

Further, for example, although the printer 3 described above prints a drawing on a surface of the material member, it is an example and the present invention is not limited thereto. That is, the printer 3 may adopt an arbitrary method capable of showing a drawing on a surface of the material member, such as printing on a seal, a transfer sheet, or the like and affixing the same on the material member. Further, that is, any device and method capable of showing the drawing by projection may be adopted on the surface of the material member.

Further, for example, although the prescribed three-dimensional shape including a plurality of faces is acquired to create the developed view, the isolated plan view, or the like in the above description, this is an example, and the present invention is not limited thereto. That is, the developed view or the isolated plan view may be acquired, and the three-dimensional shape may be specified on the basis of the acquired view to create a mold of a member shape having the fitting part.

Further, for example, although the order of the step of cutting by the laser cutter device 2 is displayed by the color coding of the line indicating the cutting stroke in the above description, it is an example and the present invention is not limited thereto. That is, the order of the steps of cutting may be displayed by a thick line, a broken line, a dashed line, a double line, or the like.

Further, for example, the series of processes described above can be executed by hardware or software. In other words, the functional configuration of FIG. 3 is merely an example and is not particularly limited. That is, it is sufficient if the server has function capable of executing the series of processes described above as a whole, and the functional block used to realize the function is not particularly limited to the example of FIG. 3. Further, the locations of the functional blocks are not particularly limited to those in FIG. 3 and may be arbitrary. Further, one functional block may be configured by hardware alone, may be configured by software alone, or may be configured by a combination of them.

Further, for example, when a series of processes is executed by software, a program that configures the software is installed in a computer or the like from a network or a recording medium. The computer may be a computer incorporated into dedicated hardware. Further, the computer may be a computer capable of executing various types of functions by installing various types of programs, for example, a smartphone, a personal computer, various devices, or the like in addition to a server.

Further, for example, a recording medium including such a program is not only configured by a removable medium (not illustrated) which is distributed separately from a device main body to provide the program to the user but also configured by a recording medium or the like provided to the user in a state in which it is incorporated into the device main body in advance.

In this specification, steps of describing the program recorded in the recording medium are not limited to processes which are performed chronologically in accordance with the order but include processes which are not necessarily chronologically executed but executed in parallel or individually. Further, in this specification, a term "system" refers to the entire device constituted by a plurality of devices, a plurality of means, or the like.

In other words, the CAD device to which the present invention is applied can have various forms of embodiment having the following configuration. A CAD device (for example, the CAD device 1 of FIG. 3) that creates a mold for cutting out at least one component for forming a prescribed three-dimensional shape from a material member, the device including: a creation means (for example, the mold creation unit 33 of FIG. 3) that creates a mold for a component having a fitting part for fitting with another, adjacent component on the basis of a developed view or an isolated plan view of the prescribed three-dimensional shape. Thus, it is possible to provide a technique for forming a prescribed three-dimensional shape from a material member having a prescribed thickness.

Here, the device may further include a generation means (for example, the cut-out order determination unit 34 in FIG. 3) that generates information indicating cut-out order to each component or to each of a plurality of isolated elements in the component. Thus, it is possible to provide a technique for clipping a prescribed material member in efficient order of steps using a laser cutter or the like.

EXPLANATION OF REFERENCE NUMERALS

1 . . . CAD DEVICE, 2 . . . LASER CUTTER DEVICE, 3 . . . PRINTER, 11 . . . CPU, 12 . . . ROM, 13 . . . RAM, 14 . . . BUS, 15 . . . OUTPUT INTERFACE, 16 . . . OUTPUT UNIT, 17 . . . INPUT UNIT, 18 . . . STORAGE UNIT, 19 . . . COMMUNICATION UNIT, 20 . . . DRIVE, 21 . . . REMOVABLE MEDIUM, 31 . . . THREE-DIMENSIONAL SHAPE ACQUISITION UNIT, 32 . . . FACE CONFIGURATION ANALYZING UNIT, 33 . . . MOLD CREATION UNIT, 34 . . . CUT-OUT ORDER DETERMINATION UNIT, 35 . . . CUT-OUT INSTRUCTION UNIT, 41 . . . DEVELOPED VIEW GENERATION UNIT, 42 . . . ISOLATED PLAN VIEW GENERATION UNIT

The invention claimed is:

1. A CAD device for creating an outline for cutting out at least one component for forming a prescribed three-dimensional shape from a material member, the CAD device comprising:
a processor that is connected to memory and controls communication with an outside, including at least a laser cutter device;
a display that displays design drawing image; and
an input/output interface that is connected to the processor that controls the display of the display and accepts user-instructed operations,
wherein the processor:
acquires information on a prescribed three-dimensional shape via communication with the outside;
creates a developed view or an isolated plan view of the prescribed three-dimensional shape by face configuration analysis that analyzes a configuration of faces of the prescribed three-dimensional shape based on the information;
creates an outline of a plurality of components with fitting parts for fitting cut out parts to each other, based on the developed view or the isolated plan view of the prescribed three-dimensional shape; and
determines and displays on the display, an order of cutting out the components by the laser cutter device,
wherein the order of cutting out the components is determined by an association of a distinct color information from a plurality of predetermined colors that are selectable for each component, and
wherein each distinct color is used to color coding of a line representing a cutting stroke, which corresponds to the order of cutting out the components.

2. The CAD device according to claim 1, the material member is a material member having a prescribed thickness, and MDF (Medium Density Fiberboard) is included as the material member.

3. A non-transitory computer readable medium storing a program that causes a computer that controls a CAD device for creating an outline for cutting out at least one component for forming a prescribed three-dimensional shape from a material member to execute a method,
the CAD device comprising:
a processor that is connected to memory and controls communication with an outside, including at least a laser cutter device;
a display that displays image; and
an input/output interface that is connected to the processor that controls the display of the display and accepts user-instructed operations,
the method comprising:
acquiring information on a prescribed three-dimensional shape via communication with the outside;
creating a developed view or an isolated plan view of the prescribed three-dimensional shape by face configuration analysis that analyzes a configuration of faces of the prescribed three-dimensional shape based on the information; and
creating an outline of a plurality of components with fitting parts for fitting cut out parts to each other, based on the developed view or the isolated plan view of the prescribed three-dimensional shape,
determining and displaying on the display, an order of cutting out the components by the laser cutter device,
wherein the order of cutting out the components is determined by an association of a distinct color information from a plurality of predetermined colors that are selectable for each component, and
wherein each distinct color is used to color coding of a line representing a cutting stroke, which corresponds to the order of cutting out the components.

4. The CAD device according to claim 1, wherein the processor further determines a predetermined position in the order of cutting out the components so that all the components of the prescribed three-dimensional shape can be cutting out from one sheet of the material member.

5. The non-transitory computer readable medium according to claim 3, wherein the method further comprises determining a predetermined position in the order of cutting out the components so that all the components of the prescribed three-dimensional shape can be cutting out from one sheet of the material member.

* * * * *